Sept. 5, 1933.   C. A. BERGGREN   1,925,366
SAMPLING DEVICE FOR LIQUIDS
Filed July 16, 1928   2 Sheets-Sheet 1
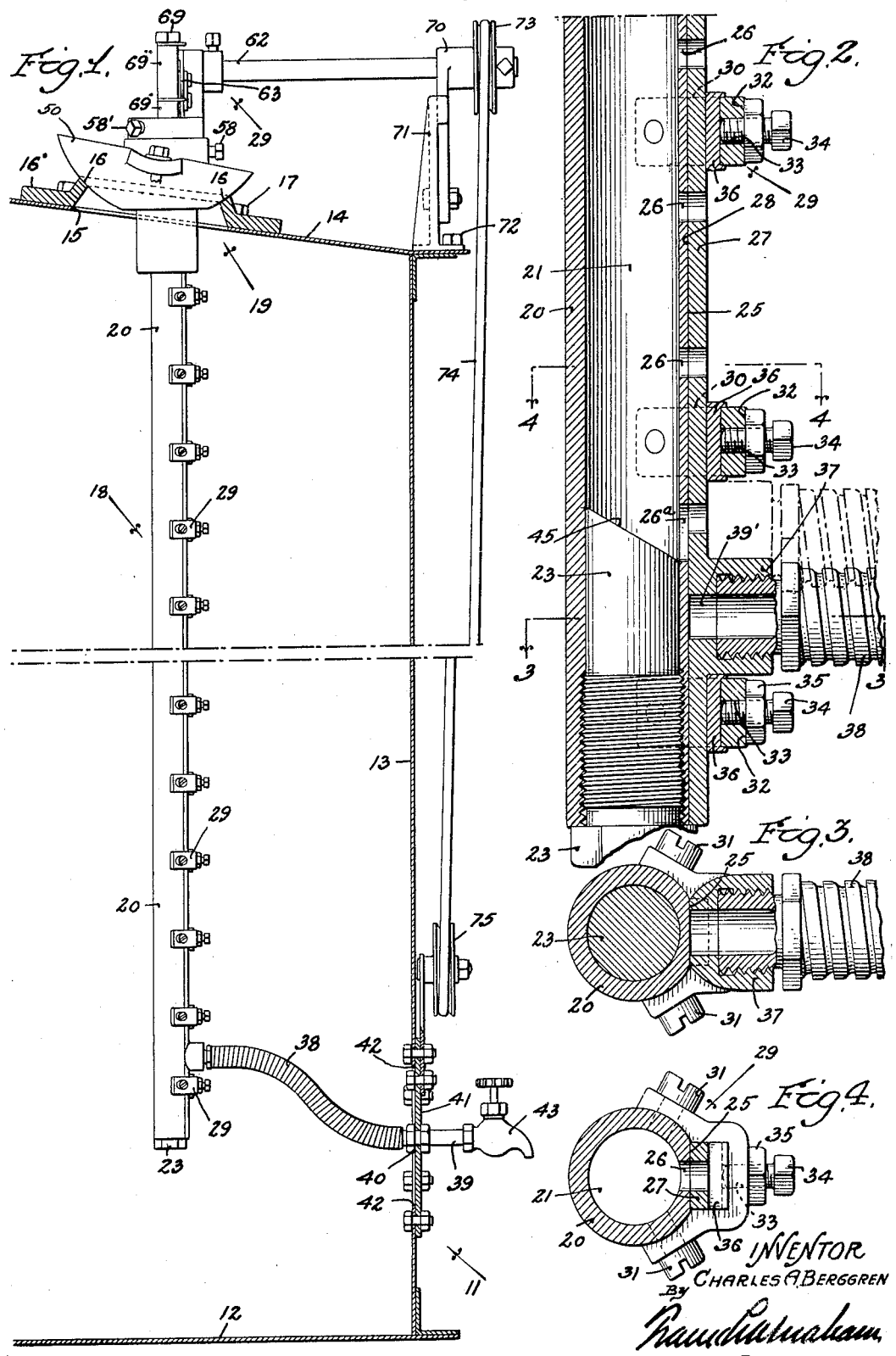

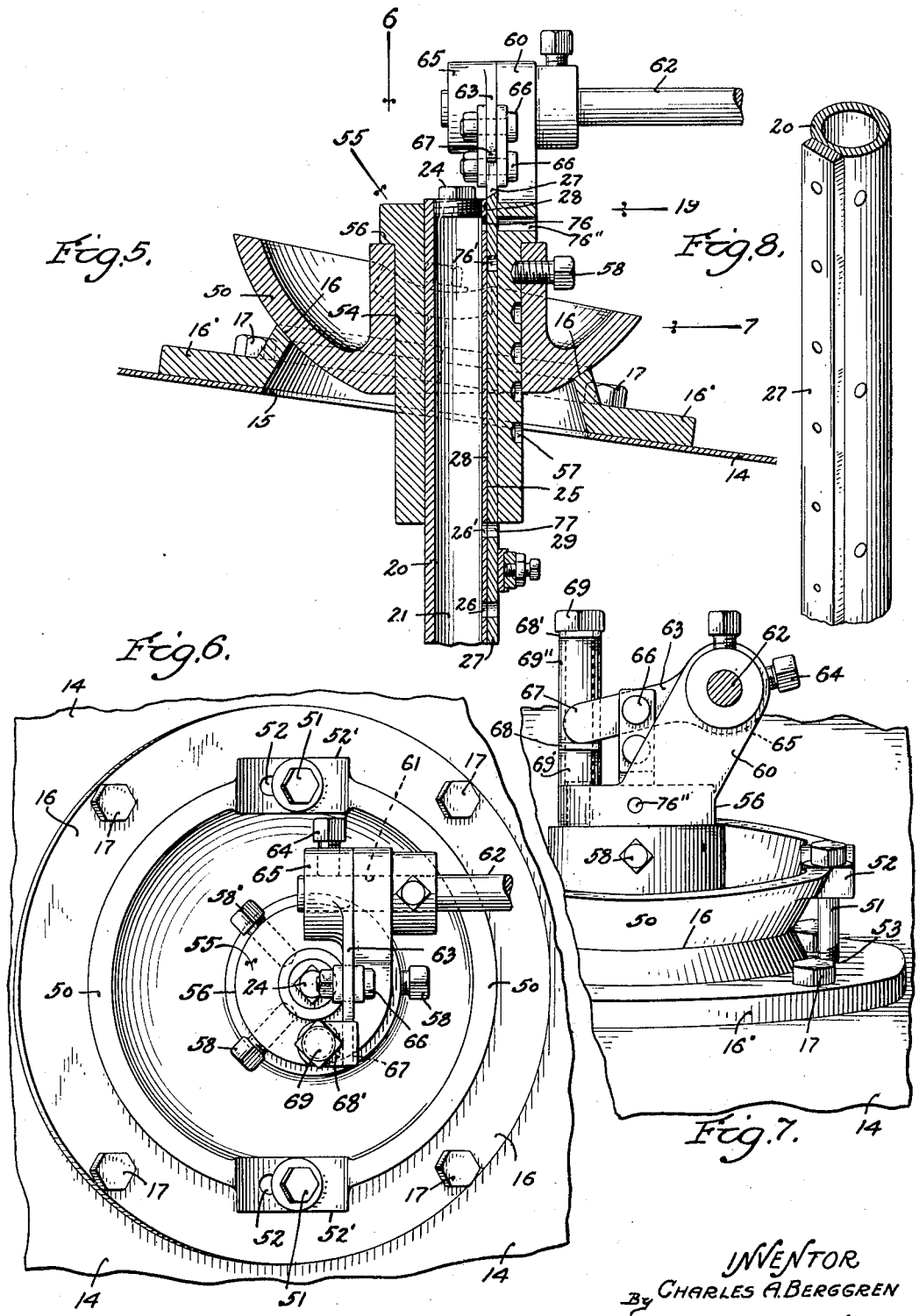

Patented Sept. 5, 1933

1,925,366

UNITED STATES PATENT OFFICE 1,925,366

SAMPLING DEVICE FOR LIQUIDS

Charles A. Berggren, Los Angeles, Calif., assignor to Morris B. Pendleton, San Gabriel, Calif.

Application July 16, 1928. Serial No. 293,210

1 Claim. (Cl. 137—18)

This invention is a device for removing a small uniform samples of liquid from a large body of liquid such as may be contained within tanks, reservoirs or the like, and may be considered to be a device of the class described in my co-pending application, Serial No. 293,211, which was filed July 16, 1928.

It is well known that liquids such as petroleum are ordinarily stored in tanks or reservoirs and inasmuch as the contents of these tanks or reservoirs are ordinarily sold upon the basis of an analysis of a sample obtained therefrom, it is necessary to obtain as nearly as possible a sample which will correspond to the vertical column of liquid extending throughout the height of the tank.

Various devices have been developed for the purpose of obtaining such samples and have met with varying degrees of success. The major difficulty which has been encountered is the development of a device which will remain suspended within the tank and which may be operated, and from which the sample may be withdrawn at a convenient point outside of the tank, but into which no liquid will leak or be admitted while the device is in a non-sampling position.

The general construction of the organization to which this application relates comprises a longitudinally extending member which has a chambered passage extending lengthwise therethrough and which is provided with a bearing surface over which a so-called gate member having a correspondingly formed bearing surface is adapted to be held in a slidable engagement.

The mentioned longitudinal chambered member is provided with a plurality of passages which extend from the chamber through the gate bearing surface, and the mentioned gate member is provided with a plurality of similarly arranged apertures, which are adapted to cooperate with the passages to permit the entrance of fluid throughout the length of the chamber.

The lower end of the chamber is provided with an outlet which is preferably connected with an extending accessible discharge passage, and the entire organization is adapted to be supported vertically within a tank which contains the liquid to be sampled.

A device of this character embraces a marked feature of distinction in that the slidable gate member may be adjusted to give a minimum clearance between the two bearing surfaces, thus preventing the possibility of liquid leaking into the chamber between the slidable gate member and the longitudinal chambered member.

The means for suspending the organization within the tank are preferably made adjustable, so that the sampling tube will assume a vertical position when suspended through a tank roof of any standard pitch, and may optionally be provided with an additional adjustment whereby the chamber may be placed in various positions relative to a horizontal plane.

The organization is so constructed that it may be readily placed upon the tank roof and the operating means are so arranged that the samples may be conveniently obtained at a position near the side of the tank, obviating the necessity of the operator climbing to the roof of the tank to obtain a sample.

The principal objects of this invention are the construction of a sampling device of the class described in which the parts thereof may be easily adjusted to give a minimum clearance between the bearing surfaces, and in which the sampler may be readily installed on any type of tank or reservoir and may be operated from a conveniently accessible point outside of the tank.

Another object of the invention is the construction of a sampling device which may be readily and economically made without the use of expensive machinery and skilled labor.

Other objects and advantageous features in the construction of my invention will be better understood from the following description of a preferred embodiment thereof, as shown in the accompanying drawings, in which Fig. 1 shows a tank having a sampling device suspended therein.

Fig. 2 is a sectional elevation of the lower end of the sampling organization shown in Fig. 1.

Fig. 3 is a sectional plan view, taken substantially along a plane represented by the line 3—3 in Fig. 2.

Fig. 4 is a plan section taken substantially along the plane represented by the line 4—4 of Fig. 2.

Fig. 5 is a plan section of the suspending or supporting organization shown in Fig. 1.

Fig. 6 is a plan view of the supporting organization, taken substantially in the direction of the arrow 6 in Fig. 5.

Fig. 7 is a side elevation of that part of my invention shown in Figs. 5 and 6, and Fig. 8 is a perspective view showing a preferred form of sampling tube and gate such as is used in this invention.

More particularly describing the invention as herein illustrated, reference numeral 11 designates a tank having a bottom 12, a side wall 13 and a roof or cover member 14.

The cover member 14 is provided with an aperture 15, about which a flanged bearing support 16 is mounted and retained by means such as the bolts 17 extending through an outwardly extending flange 16'.

A sampling organization generally indicated by reference numeral 18 is suspended within the tank through aperture 15, and is supported therein by means of the supporting and operating organization generally indicated by reference numeral 19.

The sampling tube or chamber comprises a longitudinal body member 20 which, in the form chosen for illustration, comprise a cylindrical tube which has an internal chamber 21 extending lengthwise therethrough, the ends of the tube being provided with threaded plugs indicated by reference numerals 23 and 24 respectively.

The longitudinal tubular member 20 is provided with a bearing surface at 25 which for convenience in construction is preferably flattened as illustrated and through which a plurality of passages 26 provide communication with the internal chamber 21.

A gate member 27 in the form of a longitudinally extending bar and provided with an internal bearing surface 28 is adapted to be held in sliding contact with the bearing surface 25 by means of a plurality of clamps 29, such clamps being illustrated as comprising arch members 30, which are retained upon the sampling tube 20 in any suitable manner, such as welding or by means of the oppositely disposed screws 31.

Each of these arch members is provided with a flattened section 32, having a threaded aperture 33 therein, which aperture is adapted to receive a set screw 34, provided with a lock nut 35 the inner end of the set screw being adapted to engage a shoe 36 which, in turn, is adapted to engage the outer surface of the sliding gate 27 and hold the same in a firm but sliding engagement with the outer bearing surface 26 of the longitudinal chambered member 20.

In the form of my invention illustrated, the lower end of the sliding gate member 27 is provided with an outwardly extending collar or outlet member 37, which is adapted to be connected in any suitable manner with a flexible outlet tube 38, the outlet tube 38 being illustrated in Fig. 1 as extending outwardly to the outlet pipe 39, which extends through a packing gland 40 in the tank wall or, as illustrated, in a cover plate 41, mounted over a manhole 42 in the side 13 of the tank.

The outlet pipe 39 may be provided with any suitable form of draining member, such as the faucet 43.

It will be observed from the illustration shown in Fig. 2 that the lower outlet passage 26a is made of a diameter which corresponds substantially to that of the drainage passage 39', and that the upward movement of the gate or slide 27 to the position such as is indicated by the dot and dash line position of the drainage member (Fig. 2) is effective to close the sampling inlet passages 26 and to open the outlet passage 26a, permitting the sample to be withdrawn from the chamber.

For the purpose of permitting a free and complete drainage of the chamber, the upper surface 45 of the lower closure plug 23 may be sloped downwardly and outwardly. This feature also prevents the accumulation of sediment in the bottom of the chamber 21.

The supporting and operating organization generally indicated by reference numeral 19, by means of which the sampling device is supported in a substantially vertical line and through which longitudinal movement is imparted to the sliding gate member, is illustrated as embodying a lower bearing member or supporting bowl 50, which is in the form of a spherical segment and the lower surface of which is adapted to engage the upper bearing edge of the supporting member 16.

This member is illustrated as being held in substantially rigid engagement with the mentioned bearing member by a pair of diametrically disposed bolts 51, which extend downwardly through slots 52 in dished ears 52' formed on the upper outer periphery of the bowl member, and are received by suitably prepared and threaded apertures 53 in the lower supporting flange 16' as is best illustrated in Fig. 7.

The bowl or bearing member 50 is provided with a substantially centrally located throat 54, which receives a sample tube supporting sleeve 55. The upper end of the sleeve 55 is provided with an outwardly extending flange 56, which engages the upper periphery of the throat member 54, and the outer periphery of the lower portion of the sleeve 55 is provided with a plurality of depressions or recesses 57, which receive a set screw 58, supported in the throat member 54, and by means of which a vertical adjustment may be imparted to the sleeve 55.

The sampling tube 20 is upwardly received by the sleeve 55 in a manner best illustrated in Fig. 5, and is retained therein by means such as a plurality of set screws indicated by reference numeral 58'.

Longitudinal movement may be imparted to the sliding gate member 27 through any desired construction, but a preferred means for imparting such movement to this member embodies an externally accessible organization illustrated as consisting of an upwardly extending bearing standard 60, which is illustrated as being mounted upon or formed integrally with the so-called sleeve member 55, and as having provided therein a shaft bearing aperture 61, which receives a rotatable shaft 62.

The rotatable shaft 62 supports an outwardly extending arm or finger 63 which is retained thereon by means such as a set screw 64, extending through a collar 65 formed on the arm 63. The arm 63 supports the upper end of the sliding gate member 27 in any preferred manner, such as by means of the bolts 66, and it will be observed that a partial rotation of the shaft 62 will effect a vertical movement of the mentioned gate.

In order that the gate may not be drawn out of alignment, and to prevent relative jambing of parts, it is preferable to provide the arm 63 with an extension 67, which acts as a stop member, being adapted to engage stop plates 68 and 68', which are illustrated as being supported by means of a downwardly extending bolt 69, mounted in the upper end 56 of the sleeve 55.

The stop members 68 and 68' are maintained in adjustable relation with each other by means such as the rings or sleeves indicated by reference numerals 69' and 69''.

The outer end of the shaft 62 may be supported in any preferred manner, but is illustrated as being received by a bearing sleeve 70, formed upon the upper end of an adjustable supporting standard 71, the lower end of which is retained upon the tank roof 14 by means such as the bolt 72.

The outer end of the shaft 62 may be provided with any rotating means, such as the pulley 73, which receives a flexible member illustrated as comprising a cable 74, the cable forming a loop over a lower pulley 75, arranged in any convenient position which may be readily reached by an operator.

In order to compensate for the decreasing pressure from the bottom to the top of the tank, it has been found advantageous to provide the sliding gate member with apertures which vary from a small to a large area between the bottom and top of the tank as illustrated in Fig. 8. It will thus be apparent that the apertures may be calibrated relative to the pressure conditions in the tank and the viscosity of the liquid to permit exactly the same quantity of liquid to enter each of the passages when the sampling gate is opened.

The upper end of the sampling tube 20, the gate member 27 and the sleeve 55 may be provided with vent openings indicated by reference numerals 76, 76' and 76'' respectively which cooperate to permit the entrance of air during a withdrawal of the sample and the tubes and the gate are provided with secondary vent openings 26 and 77' to permit the egress of air or vapors during the admission of the sample.

It will be understood that, in the event the cooperating bearing surfaces between the two members are substantially flat that through a slight modification in the operating and clamping organization the operating movements between the two members may be made in a transverse instead of a longitudinal direction and it therefore follows that although I have herein described and illustrated one preferred embodiment of my invention, it is not restricted to the precise construction set forth but includes within its scope whatever changes may fairly come within the spirit of the appended claim.

I claim as my invention:

For use in combination with a tank, a liquid sampling device embodying: a longitudinal body member having a chamber formed lengthwise therein and having a longitudinal apertured bearing surface; a cooperatively apertured gate member in sliding engagement with said bearing surface; means for suspending said body member through a tank roof; means for imparting relative sliding movement to said members; and means for withdrawing liquid from said chamber including an outlet formed in the lower end of said gate member, a flexible tubular member mounted on said slidable member communicating with said outlet, and a drain member extending through a wall of said tank and communicating with said flexible tubular member.

CHARLES A. BERGGREN.